United States Patent Office.

SYLVESTER BISSELL, OF HARTFORD, CONNECTICUT.

*Letters Patent No. 62,521, dated March 5, 1867.*

---

IMPROVED COMPOSITION FOR BUILDING MATERIAL.

---

*The Schedule referred to in these Letters Patent and making part of the same.*

---

TO ALL WHOM IT MAY CONCERN:

Be it known that I, SYLVESTER BISSELL, of Hartford, county of Hartford, and State of Connecticut, have invented certain new and useful improvement in Composition for Building Material; and to enable others skilled in the art to make and use the same, I will proceed to describe it.

The object of this invention consists in compounding or congealing together by the use of suitable material, as hydraulic cement or quick-lime, fine particles of iron, as shavings or filings, with gravel or sand in various proportions of about one-third (more or less) each, and mixed with water.

This composition is particularly adapted for window sills, window caps, door caps, &c., especially where it is desirable to produce ornamental projections. It is only necessary to prepare moulds having the shape and configuration it is desired should appear upon the work; then prepare the required amount of composition in about the above-described quantities of each material, and mixed together with hydraulic cement, or with quick-lime as a substitute therefor; then pour the same into said moulds and lay away carefully to dry until perfectly hard; the longer it is left to harden the stronger it becomes. For large work it should not be used for six or eight weeks.

By the use of this invention I am enabled to produce a material or composition, the work from which will be less than one-fourth of the cost of stone, and which it is believed will be found to be equally strong and durable.

I believe I have thus shown the nature, construction, and advantage of this invention so as to enable others skilled to make and use the same therefrom.

What I claim, therefore, and desire to secure by Letters Patent, is—

A composition for building material, substantially as and in the proportions as described.

SYLVESTER BISSELL. [L. S.]

Witnesses:
ANNIE STONE,
JEREMY W. BLISS.